(12) United States Patent
Pouttu

(10) Patent No.: US 6,606,348 B1
(45) Date of Patent: Aug. 12, 2003

(54) RECEIVING METHOD AND RECEIVER FOR SPREAD SPECTRUM SIGNALS

(75) Inventor: Ari Pouttu, Oulu (FI)

(73) Assignee: Nokia Corporation, Espoo (FI)

( * ) Notice: Subject to any disclaimer, the term of this patent is extended or adjusted under 35 U.S.C. 154(b) by 53 days.

(21) Appl. No.: 09/711,673

(22) Filed: Nov. 9, 2000

Related U.S. Application Data

(63) Continuation of application No. PCT/EP99/01706, filed on Mar. 16, 1999.

(51) Int. Cl.[7] .............................................. H04B 1/707
(52) U.S. Cl. ....................................................... 375/144
(58) Field of Search ................................ 375/130, 140, 375/142, 143, 144, 148, 150, 152

(56) References Cited

U.S. PATENT DOCUMENTS

| 5,629,929 A | * | 5/1997 | Blanchard et al. | .......... 370/201 |
| 6,052,421 A | * | 4/2000 | Richardson et al. | ........ 342/101 |

FOREIGN PATENT DOCUMENTS

| EP | 0580243 A2 | 1/1994 |

OTHER PUBLICATIONS

John Gevargiz, Pankaj K. Das and Laurence B. Milstein; "Adaptive Narrow–Band Interference Rejection In a DS Spread–Spectrum Intercept Receiver Using Transform Domain Signal Processing Techniques", IEEE Transactions On Communications, US, IEEE Inc., New York, vol. 37, No. 12, pp. 1359–1365.

Emmanuel G. Kanterakis; A novel Technique For Narrowband/Broadband Interference Excision in DS–SS Communications (Proceedings of the Military Communications Conference—MILCOM), IEEE, US, New York, pp. 628–632.

International Search Report for PCT/EP99/01706.

* cited by examiner

Primary Examiner—Stephen Chin
Assistant Examiner—Kevin Kim
(74) Attorney, Agent, or Firm—Squire, Sanders & Dempsey L.L.P.

(57) ABSTRACT

A receiver comprises input means for receiving a signal (r(t)) of a first domain. Processor means are provided for applying a transform function to the received signal to a second domain. A first extractor arrangement extracts first type of information from the signal in the second domain. A plurality of processor means, each of which is arranged to receive a plurality of information portions, apply said transform function thereto and provide a transformed output. A second extractor arrangement extracts a second, different type of information from the output of each said plurality of processor means. Compensation Circuitry compensates the received signal using one of the second type of information extracted.

20 Claims, 2 Drawing Sheets

RECEIVING METHOD AND RECEIVER FOR SPREAD SPECTRUM SIGNALS

This is a continuation of PCT/EP99/01706 filed on Mar. 16, 1999.

FIELD OF INVENTION

The present invention relates to a receiver and a receiving method and, in particular, but not exclusively to a spread spectrum receiver and method of receiving spread spectrum signals.

BACKGROUND OF THE INVENTION

In wireless cellular telecommunication networks, the network is divided into a plurality of cells each of which is served by a base station. Each base station is arranged to communicate with mobile terminals in the cell associated with the base station. Spread spectrum techniques have been proposed for use with cellular networks. For example, the IS-95 standard in the USA uses a direct sequence spread spectrum technique which is often referred to as a code division multiple access (CDMA) technique. In these systems, a plurality of users in the different cells use the same frequency at he same time. The users are generally distinguished by different spreading codes. The capacity and signal quality of such a system is strongly influenced by the amount of interference and how effectively interference can be removed from received signals. If the signal processing can be improved to further remove interference, a greater degree of interference can in practice be tolerated which will in turn lead to a potential increase in capacity and/or signal quality.

One type of interference which arises is "narrow band interference". In other words, the bandwidth of the interference is much less than the frequency band over which the signal is spread. The inherent processing gain of spread spectrum systems may provide some protection against narrowband interference. However, in some situations, the power level of that narrow band interference is sufficiently high that the system is not able to provide protection against that interference.

In an article entitled "A Novel Technique For Narrowband/Broadband Interference Excision in DS-SS Communications (Proceedings of Milcom 1994 Conference pages 628–632), E Kanterakis discusses a technique for reducing the narrowband interference. The technique described in this document relies on setting the magnitude response of the received sigrnal Fourier transform to a predetermined function while leaving the phase response unchanged. The Fourier transform magnitude response is made as constant as possible over the entire signal spectrum to thereby provide a whitening filter. In this document, amplitude response is set to a magnitude response which is representative of a single bit of the received signal with interference.

SUMMARY OF THE INVENTION

It is therefore an aim of embodiments of the present invention to provide a receiver which is capable of providing an improved narrowband interference suppression.

According to one aspect of the present invention there is provided a receiver comprising input means for receiving a signal of a first domain; processor means for applying a transform function to the received signal to transform said signal to a second domain; a first extractor arrangement for extracting a firs: type of information from the signal in the second domain; a plurality of processor means, each of which is arranged to receive a plurality of information portions, apply said transform function thereto and provide a transformed output at each of said plurality of processor means; a second extractor arrangement for extracting a second, different type of information from the output of each of said plurality of processor means; and compensation circuitry for compensating the received signal using one of the second type of information extracted from one of the outputs of the to plurality of processor means.

In practice, the arrangement defined hereinbefore which uses a plurality of information portions provides significantly better results than the arrangement of the document mentioned previously.

The input means may receive a spread spectrum signal. The spread spectrum signal may be a direct sequence spread spectrum signal. The spread spectrum signal may be a hybrid signal which Includes a direct sequence signal combined, for example, with a frequency hopped technique.

The first domain may be time domain. The second domain may be the frequency domain.

The processor means may use a Fourier transform function to convert the signal of the first domain to a signal in a second domain. Alternatively, any other suitable transform function may be used.

The first type of information may be phase information whilst the second type of information may be amplitude information.

Preferably, the information portions comprise bits. However, this will depend on the format of the transmitted signal. Preferably, each of the plurality of processor means is arranged to receive two bits. However, the plurality of processor means may be arranged each to receive more than two bits.

The number of processor means may be equal to the maximum number of different outputs which the second extractor arrangement is able to provide. For example, in one embodiment of the present invention, two bits may be used. Four possible is combinations are available. However, in practice, only two combinations may need to be used as the outputs of two of the combinations may be the same and the output of the other of the two combinations may be the same. In a preferred embodiment of the present invention, the number of processor means is equal to two.

The compensation circuitry may comprise means for combining the output of the first extractor arrangement with each of the outputs of the second extractor arrangement to provide a plurality of signals. The compensation circuitry may comprise decision circuitry for deciding based on the plurality of signals provided by the combining means the likely information contained in the received signal. The decision circuitry may comprise means for applying an inverse of the transfer function to the plurality of signals output by said combining means.

The decision circuitry may comprise matched filters for matched filtering the output of the combining means or equivalent circuitry such as correlation circuitry for correlating the output of the combining means. The matched filters may be connected to the outputs of the means for applying an inverse of the transform.

The receiver described hereinbefore may be incorporated in a mobile station or a base station.

According to a second aspect of the present invention, there is provided a receiving method comprising the steps of receiving a signal in a first domain; applying a transform function to the received signal to transform said signal to a second domain; extracting a first type of information from the signal in the second domain; applying said transform function to a plurality of different information portions; extracting a second, different type of information from each of the plurality of different information portions to which the transform function has been applied; and compensating the received signal using said second type of information.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF THE PREFERRED INVENTION

Figure 1:
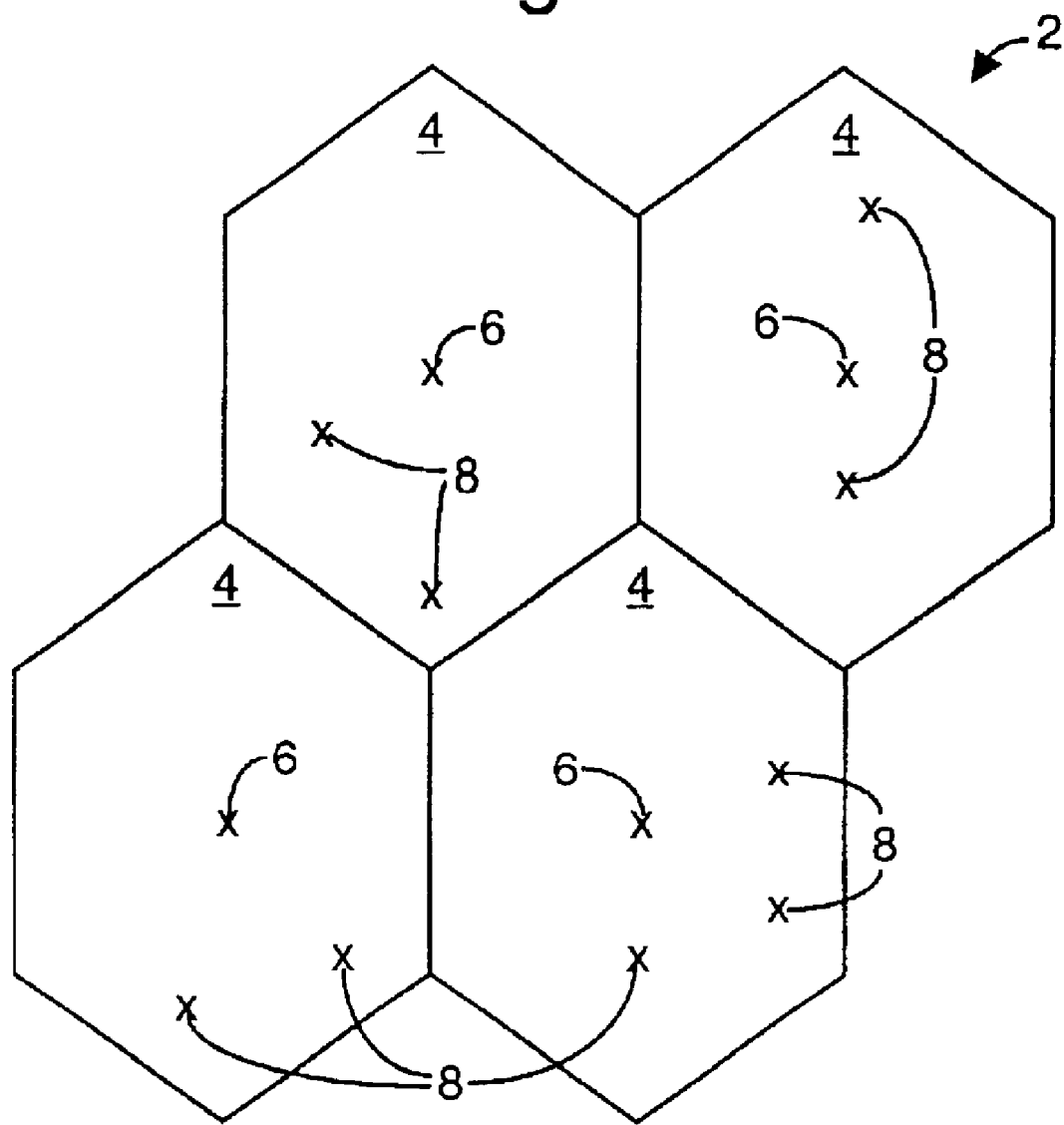
FIG. 1 snows a schematic diagram of part of a wireless cellular network.

Referring first to FIG. 1, this shows a wireless cellular network 2. The network 2 comprises a plurality of cells 4 each of which is served by a respective base transceiver station 6. Each base transceiver station 6 is arranged to send radio signals to and receive signals from terminals 8 in the cell 4 associated with the respective base transceiver station. In practice, the boundaries between the cells 4 shown in FIG. 1 may not be particularly well defined and in a spread spectrum system, the terminals may be in communication with more than one base transceiver station at the same time. This is referred to as "soft handoff". The terminals 8 may be mobile or fixed terminals. The terminals may be a mobile telephone or a data communication device.

Figure 2:
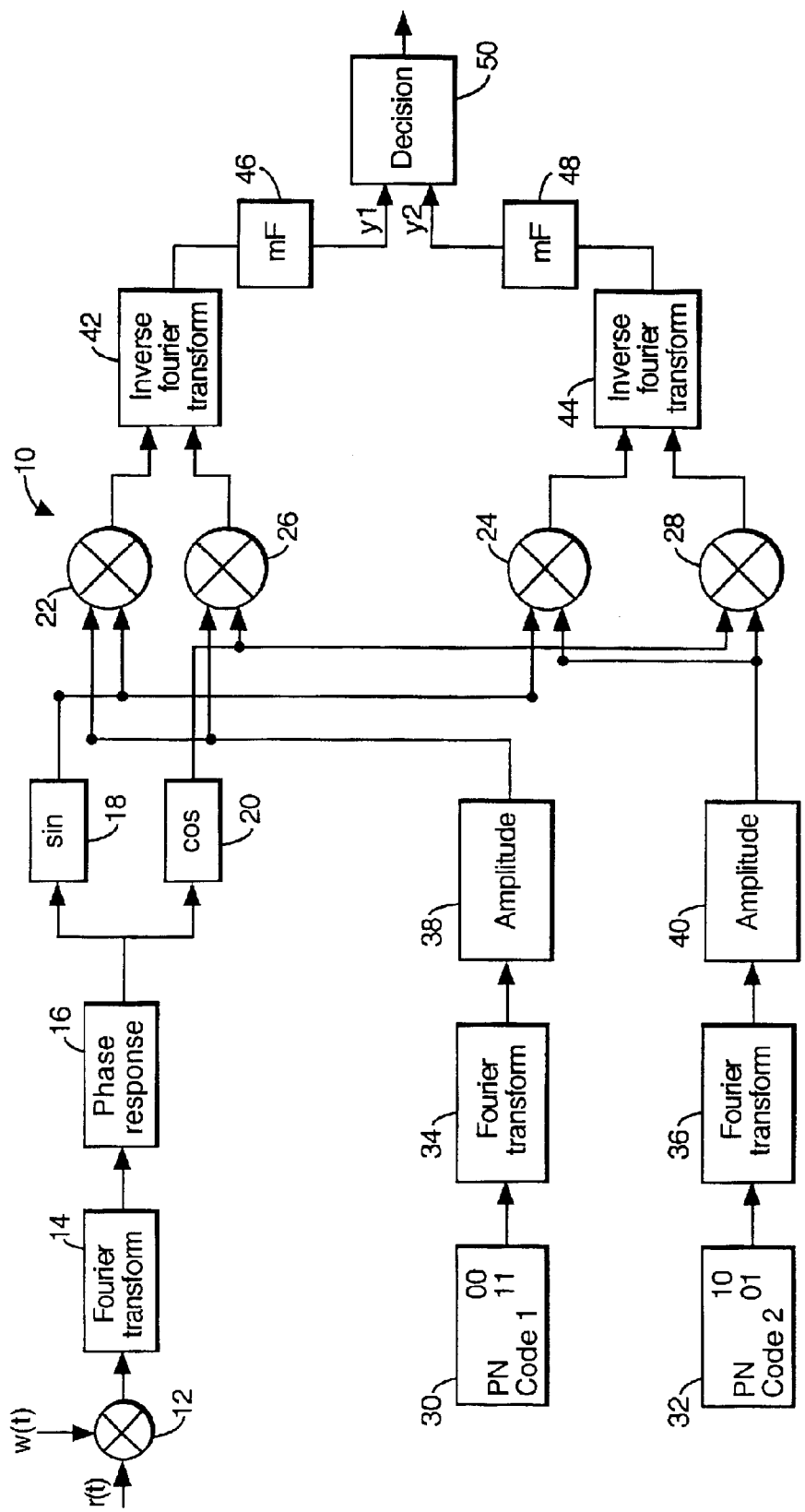
FIG. 2 shows an embodiment of the present invention.

The embodiment, of the present invention shown in FIG. 2 is used in a spread spectrum system and, in particular in a code division multiple access system. This means that the signals are direct sequence spread spectrum signals. It should be appreciated that embodiments of the present invention may also be applicable to other types of spread spectrum methods, particularly those which incorporate a direct sequence element such as a frequency hopping/direct sequence hybrid method.

FIG. 2 shows part of a receiver 10. This receiver 10 may be incorporated in a base transceiver station or a mobile station. The received signal r(t) is a spread spectrum signal. In other words, the bits to be transmitted to the receiver 10 have been spread using a spreading code. This spreading code is a psuedo random code. Using a first mixer 12, the received signal is mixed with a window function w(t). The window function effectively allows the relevant portion of the received signal to be considered. It should be pointed out that the received signal is in the time domain. The output of the mixer can be expressed in the following form:

$$r_w(n) = r(t)w(t)$$

This can be expressed more fully as follows:

$$r_w(n) = \left[\sqrt{2S}\sum_{k=1}^{N} b_k \sum_{i=1}^{L} c_i p\left(\frac{nT_c}{2} - iT_c\right) + J_c\left(\frac{nT_c}{2}\right) + n_c\left(\frac{nT_c}{2}\right)\right]w\left(\frac{nT_c}{2}\right), n = 1, \ldots, 2L-1$$

where I=1,2 indicating in this example 2 samples/chip
where S=the power of the signal,
b=the data bet,
$c_i$=the spreading code, $$p\left(\frac{nT_c}{2} - iT_c\right) = \text{the chip wave form where } T_c \text{ is the chip interval,}$$

$LT_c$ is the length of the spreading sequence,
n=the sample number,
i the index of the summation, $$J_c\left(\frac{nT_c}{2}\right)$$

is the interference, and $$n_c\left(\frac{nT_c}{2}\right)$$

is noise.

The received signal can thus be represented by the sum of the transmitted signal, the interference to the transmitted signal and the noise.

The output of she first mixer 12 is input to a Fourier transform processor 14 which applies a Fourier transform to the received signal. The application of the Fourier transform converts the signal from the time domain to the frequency domain.

The output of the Fourier transform processor 14 is input to a phase response extraction unit 16 which calculates the phase response of the Fourier transformed received signal over two bit intervals. The received signal will generally have been phase modulated. Therefore the information contained in the received signal can be obtained from the calculated phase response. The output of the phase response extraction unit 16 be represented as follows:

$$\theta \tilde{r}_w(k) = \arctan\left[\frac{\text{Im}[\tilde{r}_{rect}(k)]}{\text{Re}[\tilde{r}_{rect}(k)]}\right]$$

where $$\tilde{r}_{rect}(k) = \sum_{n=0}^{N_{DFT}-1} r_w(n) \cdot c^{-i2\pi nk/N_{DFT}}, k = 0, \ldots, N_{DFT}$$

$N_{DFT}$ represents the complex transform coefficients yielded by the Fourier transform processor 14, in Cartesian co-ordinates, and Re and Im epresent the real and imaginary parts of $r_{rect}$ (k) respectively.

The output of the phase response extraction unit 16 is input to the in phase response extraction unit 18 which takes the sine value of the output of the phase response and the quadrature unit 20 which takes the cosine of the output of the phase response unit 16. The output of the in phase signal unit 18 is input to a second and a fourth mixer 22 and 24 respectively. Th output of the quadrature signal unit 20 is input to a third and a fifth mixer 26 and 28 respectively.

If two bits are considered, the following combination of values are possible: 00;11;01 and 10. These can be divided into two groups. 00 and 11 are in the first group, and 01 and 10 are in the second group. The bits 00 or 11 are multiplied in a first spreading code unit 30 with the same spreading code which is used to spread the received signal. A second spreading code unit 32 is provided for spreading the bits 10 or 01 by than same spreading code as used in the first spreading coded unit 30. These spreading codes are typically referred to as PN codes i.e. psuedo random noise codes.

The output of he first and second spreading code units 30 and 32 are input to respective further Fourier transform processors 34 and 36 respectively. Each of these further Fourier transform processor 34 and 36 convert the output of the spreading code units 30 and 32 from the time domain to the frequency domain.

The output of the respective further Fourier transform processors 34 and 36 are input to respective amplitude response units 36 and 40 respectively. As the amplitude response units 38 and 40 consider the magnitude of the signal regardless of whether it is "positive" or "negative", the results for the bits 00 and 11 are the same and likewise the results Nor bits 10 and 01 are also the same. Accordingly, all four possible combinations do not need to be considered separately. The amplitude response calculated by the amplitude unit 38 associated with the first spreading code block 30 can be represented a follows:

$$T_1(k) = \left| \sum_{n=0}^{N_{DFT}-1} \left[ \sum_{j=0}^{l} b_j(set1) \sum_{i=0}^{L-1} c_n p(t-nT_c) \right] e^{-j2\omega k/N_{DFT}} \right| k = 0, \ldots, N_{DFT-1}$$

Likewise, the amplitude response calculated by the amplitude response unit 40 associated with the second spreading code unit can be represented as follows:

$$T_2(k) = \left| \sum_{n=0}^{N_{DFT}-1} \left[ \sum_{j=0}^{l} b_j(set1) \sum_{i=0}^{L-1} c_n p(t-nT_c) \right] e^{-j2\omega k/N_{DFT}} \right| k = 0, \ldots, N_{DFT-1}$$

where b(set 1)=[1,1] (PN-code1 and b(set 2)=[-1,1] (PN-code 2).

The output of the first amplitude response block 38 corresponding to the first spreading code unit 30 is input to the second and third mixers 22 and 26. The output of the second amplitude response block 40 associated with the second spreading code unit 32 is input to the fourth and fifth mixers 24 and 28. Each of the second to fifth mixers 22–28 thus receives two signals and mixes those signals together. One of the signals will be the phase response of the received signal from either the inphase unit 18 or the quadrature unit 20 whilst the other signal is an amplitude response signal for possible bit values from one of the amplitude response units 38 and 40. The output of the second and third mixers 22 and 26 can be represented as follows:

$$T_1(k)\cos\theta\tilde{r}_w(k) + jT_1(k)\sin\theta\tilde{r}_w(k)$$

Likewise, the output of the fourth and fifth mixers 24 and 28 can be represented as follows:

$$T_2(k)\cos\theta\tilde{r}_w(k) + jT_2(k)\sin\theta\tilde{r}_w(k)$$

The output of the second and third mixers 22 and 26 are input to a processor 42 which carries out the inverse Fourier transform. Likewise, the outputs of the fourth and fifth mixers 24 and 28 are input to a second inverse Fourier transform processor 44 which applies the inverse Fourier transform.

The output of the first inverse Fourier transform processor 42 can be represented as follows:

$$\hat{r}\Delta_1(n) = \sum_{k=0}^{N_{DFT}-1} [T_1(k)\cos\theta\tilde{r}_w(k) + jT_1(k)\sin\theta\tilde{r}_w(k)]e^{-j2\pi nk/N_{DFT}} n = 0, \ldots, N_{DFT-1}$$

Likewise, the output of the second inverse Fourier transform unit can be represented by $$\hat{r}\Delta_2(n) = \sum_{k=0}^{N_{DFT}-1} [T_2(k)\cos\theta\tilde{r}_w(k) + jT_2(k)\sin\theta\tilde{r}_w(k)]e^{-i2\pi nk/N_{DFT}} n = 0, \ldots, N_{DFT-1}$$

It should be appreciated that the transformation carried out by the inverse Fourier transform processors 42 and 44 provide time domain signals and the transform involves performing a polar-Cartesian transformation and the taking of the inverse Fourier transform of the signals.

The outputs of the inverse Fourier transform processors 42 and 44 are input to respective matched filters 46 and 48 respectively. A matched filter can be defined as a filter which immediately precedes a decision circuit 50 and a digital communications receiver is said to be matched to a particular symbol pulse if it maximises the output signal to noise ratio at the sampling instant when that pulse is present at the filter input. Each of the matched filters 46 and 48 will provide decision variables. The decision variable y1 output by the first matched filter 46 is as follows (assuming one sample/chip):

$$y1 = \Sigma_{k=0}^{2L-1} c(n)\hat{r}\Delta_1(n-k)$$

Likewise, the decision variable y2 of the second matched filter 48 is as follows:

$$y2 = \Sigma_{k=0}^{2L-1} c(n)\hat{r}\Delta_2(n-k)$$

where

L is the length of he sequence and rΔ1(n−k) and rΔ2(n−k) represents inverting the sequence obtained from the output of the inverse Fourier transform and sliding.

The decision variables y1 and y2 output from the first and second matched filters 46 and 48 are input to the decision making block 50. The decision between bit pattern sets 00 and 01 and 01 or 10 is made according to:

$$\hat{b}_{set} = \max(|y1|, |y2|)$$

where y1 refers to set [00,11] and y2 to [01,10]. The decision as to which values of a given set is made according to the sign of the decision variable and hence the following rules for the final bits are as follows:

$$\hat{b} = \begin{cases} 00, & \text{if } |y1| > |y2| \wedge y1 < 0 \\ 01, & \text{if } |y1| < |y2| \wedge y2 < 0 \\ 10, & \text{if } |y1| < |y2| \wedge y2 > 0 \\ 11, & \text{if } |y1| > |y2| \wedge y1 > 0 \end{cases}$$

Thus, the decision is made that the received bits are 00 if the magnitude of decision y1 is greater than the magnitude of decision y2 and y1 is less than zero. The received bits are 01 if the magnitude of y1 is less than the magnitude of y2 and y2 is less that zero. 10 are the received bits if the magnitude of y1 is less than the magnitude of y2 and y2 is greater than 0. The bits are 11 if the magnitude of y1 is greater than the magnitude of y2 and y1 is greater than zero.

The apparatus and method described hereinbefore allows narrow band interference in the frequency domain to be dealt with. The amplitude information of the received signal is replaces with a "known" amplitude response of the data signal. In other words, each of the possible amplitude responses are determined and used to correct the received signal. The matched filters are then used to make a decision as to which of the possible amplitude compensation signals provides the best compensation.

The matched filters can be replaced by, for example, a correlator integrator processor or any other suitable element. The matched filtering is described as being performed in the time domain. However, the matched filtering can also take place in the frequency domain.

The method and apparatus has been described in the context of an arrangement where two bits are considered. This method and apparatus can be modified to be used with more than two bits. The number of PN code blocks and associated Fourier transform and amplitude blocks may need to be increased depending on the number of possible outcomes of all the possible combinations of bits.

The various blocks shown in FIG. 2 for example one or more of the following blocks: Fourier transform processor 14, phase response extraction unit 16, the spreading code units 30 and 32, the further Fourier transform processors 34 and 36 and the amplitude extraction units may be part of a single processor. Alternatively, one or more elements may be incorporated in the same single processor. The same is true of the elements downstream of the second to fifth mixers.

What is claimed is:

1. A receiver comprising:

means for receiving a signal of a first domain;

means for applying a transform function to the received signal to transform the signal to a second domain;

a first extractor arrangement for extracting a first type of information from the signal in the second domain;

a plurality of means for processing, each of which is arranged to receive a plurality of information portions, apply a transform function thereto and provide a transformed output at each of the plurality of means for processing;

a second extractor arrangement for extracting a second, different type of information from an output of each of the plurality of means for processing; and circuitry for compensating the received signal using one of the second type of information extracted from one of the outputs of the plurality of means for processing.

2. The receiver according to claim 1, wherein the means for receiving receives a spread spectrum signal.

3. The receiver according to claim 2, wherein the spread spectrum signal is a direct sequence spread spectrum signal.

4. The receiver according to claim 2, wherein the first domain is a time domain.

5. The receiver according to claim 1, wherein the second domain is a frequency domain.

6. The receiver according to claim 1, wherein the transform function is a Fourier transform function.

7. The receiver according to claim 1, wherein the first type of information is phase information.

8. The receiver according to claim 1, wherein the second type of information is amplitude information.

9. The receiver according to claim 1, wherein the information portions comprise bits.

10. The receiver according to claim 9, wherein each of the plurality of means for processing is arranged to receive two bits.

11. The receiver according to claim 1, wherein a number of means for processing is equal to a maximum number of different outputs which the second extractor arrangement is able to provide.

12. The receiver according to claim 11, wherein the number of means for processing is equal to two.

13. The receiver according to claim 1, wherein circuitry for compensating comprises means for combining an output of the first extractor arrangement with each of outputs of the second extractor arrangement to provide a plurality of signals.

14. The receiver according to claim 13, wherein circuitry for compensating further comprises circuitry for deciding based on a plurality of signals provided by the means for combining likely information contained in a received signal.

15. The receiver according to claim 14, wherein circuitry for deciding comprises means for applying an inverse of the transform function to the plurality of signals output by the means for combining.

16. The receiver according to claim 14, wherein the circuitry for deciding comprises matched filters for matched filtering outputs of the means for combining.

17. The receiver according to claim 14, wherein the circuitry for deciding comprises circuitry for correlating outputs of the means for combining.

18. A mobile station incorporating a receiver according to claim 1.

19. A base station incorporating a receiver according to claim 1.

20. A receiving method comprising:

receiving a signal in a first domain:

applying a transform function to the received signal to transform the signal to a second domain;

extracting a first type of information from the signal in the second domain;

applying the transform function to a plurality of different information portions;

extracting a second different type of information from each of the plurality of different information portions to which the transform function has been applied; and compensating the received signal using the second type of information.

* * * * *